(12) United States Patent
Hamburg et al.

(10) Patent No.: US 10,999,057 B2
(45) Date of Patent: *May 4, 2021

(54) PROVIDING ACCESS TO A HARDWARE RESOURCE BASED ON A CANARY VALUE

(71) Applicant: Cryptography Research, Inc., Sunnyvale, CA (US)

(72) Inventors: Michael A. Hamburg, San Francisco, CA (US); Megan Anneke Wachs, San Francisco, CA (US)

(73) Assignee: Cryptography Research, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/722,407

(22) Filed: Dec. 20, 2019

(65) Prior Publication Data

US 2020/0220709 A1    Jul. 9, 2020

Related U.S. Application Data

(63) Continuation of application No. 15/603,335, filed on May 23, 2017, now Pat. No. 10,523,418.

(60) Provisional application No. 62/345,632, filed on Jun. 3, 2016, provisional application No. 62/382,633, filed on Sep. 1, 2016.

(51) Int. Cl.
| | | |
|---|---|---|
| *G06F 21/00* | (2013.01) | |
| *H04L 9/00* | (2006.01) | |
| *G06F 21/44* | (2013.01) | |
| *G06F 21/64* | (2013.01) | |
| *G06F 21/51* | (2013.01) | |
| *H04L 9/32* | (2006.01) | |

(52) U.S. Cl.
CPC .............. *H04L 9/002* (2013.01); *G06F 21/44* (2013.01); *G06F 21/51* (2013.01); *G06F 21/64* (2013.01); *H04L 9/3247* (2013.01)

(58) Field of Classification Search
CPC ....... H04L 9/002; H04L 9/3247; G06F 21/44; G06F 21/51; G06F 21/52; G06F 21/60; G06F 21/64
See application file for complete search history.

(56) References Cited

U.S. PATENT DOCUMENTS

| | | |
|---|---|---|
| 7,203,962 B1 | 4/2007 | Moran |
| 7,380,275 B2 | 5/2008 | Srinivasan et al. |
| 7,577,992 B2 | 8/2009 | Abadi et al. |
| 7,669,243 B2 | 2/2010 | Conti |
| 7,739,514 B2 | 6/2010 | Bangui |
| 7,752,459 B2* | 7/2010 | Cowan .................. G06F 21/125 713/190 |
| 7,757,098 B2 | 7/2010 | Brannock et al. |

(Continued)

*Primary Examiner* — Hosuk Song
(74) *Attorney, Agent, or Firm* — Lowenstein Sandler LLP (57) ABSTRACT

A container corresponding to executable code may be received. In response receiving the container, an assertion value may be stored in an assertion register. A final canary value may be generated based on a cycles combining a prior canary value and a mix value. A determination may be made as to whether the final canary value matches with the assertion value stored in the assertion register. In response to determining that the final canary value matches with the assertion value, one or more privilege registers may be programmed to provide access to hardware resources for the container corresponding to the executable user code.

20 Claims, 6 Drawing Sheets

(56) References Cited

U.S. PATENT DOCUMENTS

| | | |
|---|---|---|
| 8,250,374 B2 | 8/2012 | Cheng et al. |
| 8,510,726 B2 | 8/2013 | Eisen et al. |
| 8,631,248 B2 * | 1/2014 | Cowan .................. G06F 21/125 |
| | | 713/190 |
| 8,776,180 B2 * | 7/2014 | Kumar .................... G06F 21/52 |
| | | 726/3 |
| 8,990,948 B2 | 3/2015 | Kumar et al. |
| 9,298,947 B2 | 3/2016 | Dent et al. |
| 9,852,052 B2 * | 12/2017 | Thomas .................... G06F 8/70 |
| 10,223,117 B2 * | 3/2019 | de Perthuis ............. G06F 9/382 |
| 10,523,418 B2 * | 12/2019 | Hamburg ................ H04L 9/002 |
| 2003/0182572 A1 | 9/2003 | Cowan et al. |

* cited by examiner

PROVIDING ACCESS TO A HARDWARE RESOURCE BASED ON A CANARY VALUE

RELATED APPLICATIONS

This application is a continuation of U.S. patent application Ser. No. 15/603,335, filed May 23, 2017, now U.S. Pat. No. 10,523,418, issued on Dec. 31, 2019, which claims the benefit under 35 U.S.C. § 119(e) of U.S. Provisional Application No. 62/345,632, filed on Jun. 3, 2016 and U.S. Provisional Application No. 62/382,633, filed on Sep. 1, 2016, which are hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to providing access to a hardware resource based on a canary value. A device may include a secure computation environment that includes a container manager and receives containers that correspond to unsecure executable user code. The container manager may provide access to hardware resources of the secure computation environment to a container during the execution of the container. For example, the container may include or be associated with a signature. The container manager may receive the container and verify the signature associated with the container. If the signature is successfully verified, then the container manager may provide access to the hardware resources of the secure computation environment to the container. For example, the execution of the container may utilize the hardware resources. Otherwise, if the signature is not successfully verified, then the container manager may not provide the container with access to the hardware resources.

A verification of the signature may be vulnerable to a glitch attack where an attacker (e.g., an unauthorized entity) intentionally generates a malfunction with the device. For example, the attacker may cause an erroneous transition within the circuitry of the device or may corrupt data stored in a register of the device. Such a malfunction may interfere with the proper verification of the signature of a received container. For example, the glitch attack may skip operations that perform the verification of the signature so that a container with an invalid signature (e.g., a container from the attacker) may be erroneously verified. Such a glitch attack may allow an attacker to access the hardware resources of the secure computation environment.

Aspects of the present disclosure may address the above and other deficiencies by providing access to a hardware resource based on a canary value. For example, before executing a container that is received by the secure computation environment, an assertion value may be stored in an assertion register that is controlled by the secure computation environment (e.g., the assertion register is only written to by the secure computation environment). A canary value may be stored in a canary register and the canary value may be updated based on a mix value that is provided by the secure computation environment. The updating of the canary value may be repeated for multiple cycles until a final canary value has been generated. The final canary value may be expected to match the assertion value if no glitch attack has occurred.

The secure computation environment may provide access to its hardware resources for a received container by programming privilege registers in the secure computation environment. The privilege registers may specify which of the hardware resources a verified container may access during its execution. Before the privilege registers are programmed, the final canary value that has been generated may be compared with the assertion value that was previously stored in the assertion register. If the final canary value matches with the assertion value, then the privilege registers may be programmed based on the signature of the received container. Otherwise, if the final canary value does not match with the assertion value, then a glitch attack may have occurred since the final canary value does not match with the assertion value, and the secure computation environment may not program the privilege registers to allow the execution of the container to access the hardware resources. In some embodiments, the comparison of the final canary value with the assertion value may be performed in hardware after an indication to program the privilege registers has been received. For example, the hardware may include the privilege registers that indicate privileges to access other hardware resources. When a command or request to program the privilege registers (e.g., to assign privileges to access other hardware resources) is received, the comparison of the final canary value with the assertion value may be performed.

In some embodiments, the assertion value that is stored in the assertion register may be based on a type of signature of the container. As an example, a container that is to be executed by the secure computation environment may be received. A first assertion value that is selected based on the type of signature of the received container may be stored in the assertion register. Before access to hardware resources is provided to the container so that operations of the container are performed with the hardware resources, a final canary value may be generated (e.g., based on a mix value). A hardware-based comparison between the final canary value stored in the canary register and the assertion value stored in the assertion register may be performed and the privilege registers may be programmed based on the comparison. Subsequently, a second container may be received where the second container includes a second signature that is of a different type than the first signature. A different second assertion value may then be programmed into the assertion register and a second final canary value may be generated based on a different mix value. The privilege registers may then be programmed based on a comparison between the second assertion value and the second final canary value.

Accordingly, aspects of the present disclosure may provide additional security when programming privilege registers, where the privilege registers are used to specify permissions of a container when accessing hardware resources of a secure computation environment. For example, the additional security may be provided by performing the comparison of the assertion value with the canary value (i.e., the final canary value) in hardware before programming the privilege registers. Thus, if a glitch attack is performed to interrupt the signature verification operation, the hardware comparison between the assertion value and the final canary value may detect the glitch attack when the final canary value does not match with the assertion value.

Figure 1:
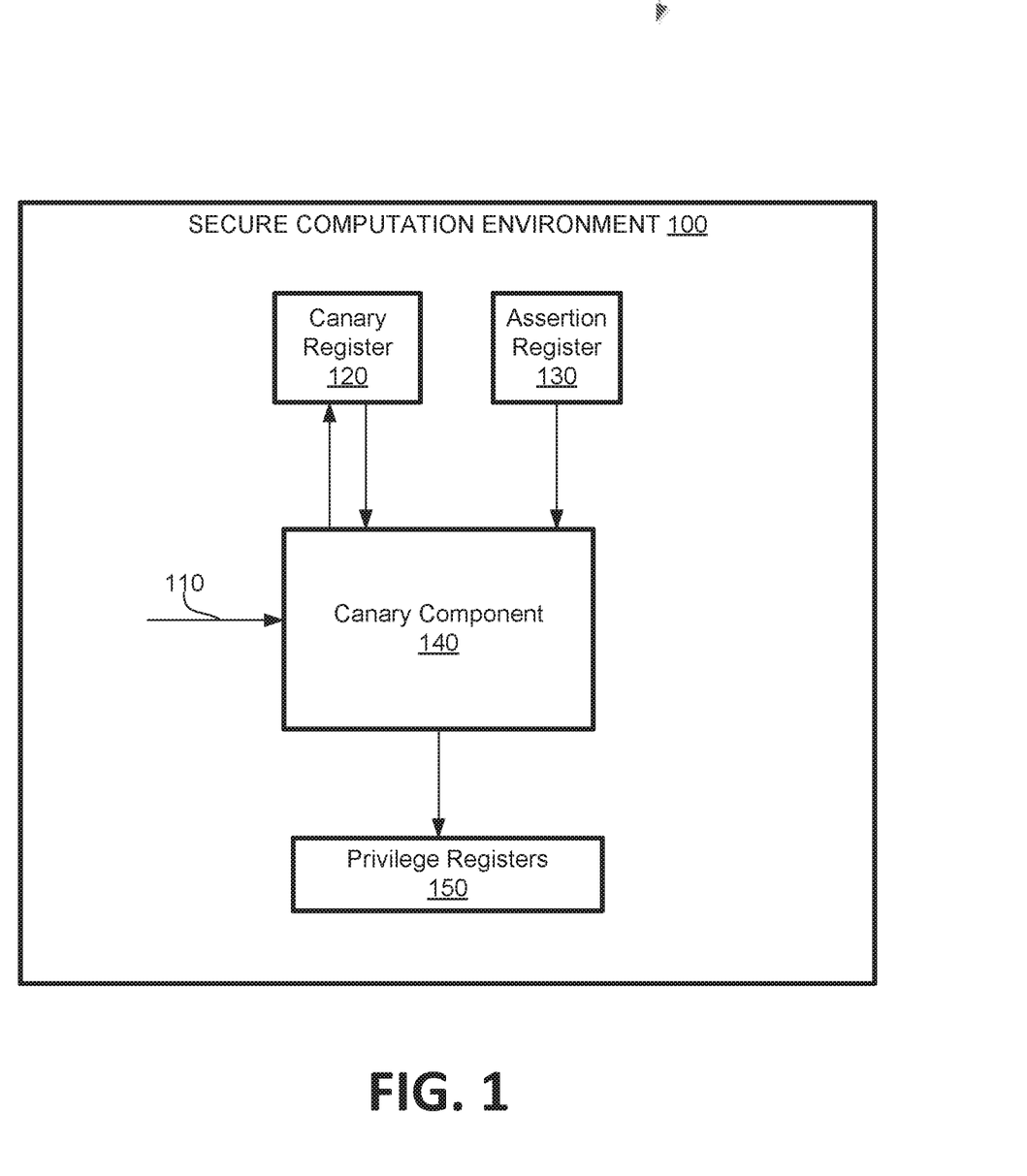
FIG. 1 illustrates an example secure computation environment with a canary component in accordance with some embodiments of the present disclosure.

FIG. 1 illustrates an example secure computation environment 100 with a canary component. In general, the secure computation environment 100 may be part of a device or an integrated circuit.

As shown in FIG. 1, the secure computation environment 100 may include a first memory element such as a canary register 120 and a second memory element such as an assertion register 130. The canary register 120 may store a canary value (e.g., a generated value that is expected to match an assertion value) that may be updated based on a mix value 110 that is received by a canary component 140 as described in further detail below. The mix value 110 may be provided by a central processing unit (CPU) of the secure computation environment 100 as described with respect to FIG. 5. The assertion register 130 may be configured to store an assertion value in response to the secure computation environment 100 receiving a new container corresponding to new executable user code.

The canary component 140 may be used to determine whether to program privilege registers 150 based on a hardware comparison between the assertion value (e.g., a pre-defined value) stored in the assertion register 130 and the canary value stored in the canary register 120. For example, the hardware comparison may be performed before writing any data to (e.g., programming) the privilege registers 150.

Figure 2:
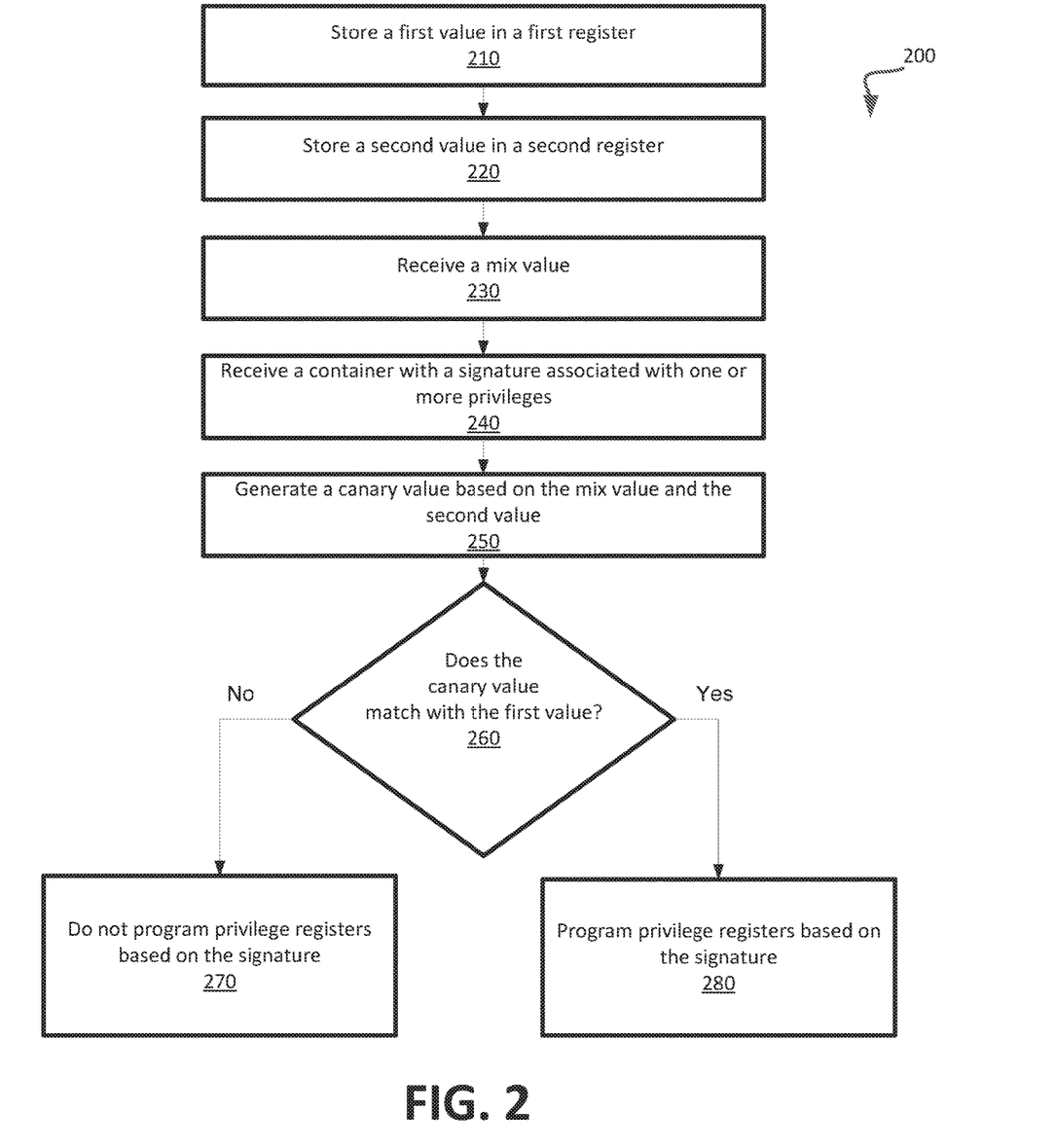
FIG. 2 is a flow diagram of an example method to provide access to a hardware resource based on a canary value in accordance with some embodiments.

FIG. 2 is a flow diagram of an example method 200 to provide access to a hardware resource based on a canary value. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the secure computation environment 100 of FIG. 1. For example, the canary component 140 may perform the method 200.

As shown in FIG. 2, the method 200 may begin with the processing logic storing a first value in a first register (block 210). For example, an assertion value may be stored in an assertion register. The assertion register may be written to by a central processing unit of the secure computation environment and may not be changed until an assertion signal is received. For example, the assertion value may not be changed in the assertion register until a comparison between the assertion value and a final canary value has been performed. The processing logic may further store a second value in a second register (block 220). For example, a first canary value may be stored in a canary register. The processing logic may further receive a mix value (block 230). For example, the mix value may be received from the central processing unit and stored in a mix register. In some embodiments, the first canary value and the assertion value may be a similar size (e.g., 64 bits) and the mix value may be a smaller size (e.g., 32 bits). The processing logic may further receive a container with a signature (e.g., a value or digital message that is used to verify an authenticity of the container) associated with one or more privileges (block 240). The privileges may correspond to particular hardware resources of the secure computation environment that may be accessed in response to an execution of the container.

The processing logic may further generate a canary value based on the mix value and the second value (block 250). For example, the canary value may be generated based on a cryptographic operation between the mix value and the second value stored in the canary register. The cryptographic operation may perform multiple cycles so that, for a first cycle, the mix value and the second value are processed or combined by the cryptographic operation to generate a first intermediate value. For a second cycle, the first intermediate value may be processed or combined with the mix value by the cryptographic operation to generate a second intermediate value. The periodic combining of the intermediate values with the mix value may result in a final canary value. In some embodiments, the mix value may be a deterministic value that is associated with a characteristic of the secure computation environment. For example, the deterministic value may correspond to the cryptographic operation (e.g., an operation that combines two or more values) that is performed with the mix value to generate the canary value. In some embodiments, the deterministic value may be based on a particular loop that is used by the cryptographic operation or a characteristic of a hardware resource of the secure computation environment.

Referring to FIG. 2, the processing logic may further determine whether the canary value matches with the first value (block 260). For example, a comparison between the canary value that has been generated by the cryptographic operation based on the mix value and the assertion value stored in the assertion register may be performed. If the canary value matches with the first value, then the processing logic may program privilege registers based on the signature of the received container (block 280). For example, values may be stored in the privilege registers so that the values allow access to particular hardware resources that have been assigned to an entity corresponding to the signature when it has been verified. Otherwise, if the canary value does not match with the first value, then the processing logic may not program the privilege registers based on the signature (block 270). In some embodiments, the container may not be executed if the privilege registers are not programmed. Thus, the container may be prevented from being executed.

As such, a hardware comparison of a canary value with an assertion value may be performed in response to an indication that a signature of a container has been verified. Privilege registers may be programmed based on the signature when the canary value matches with the assertion value.

Figure 3:
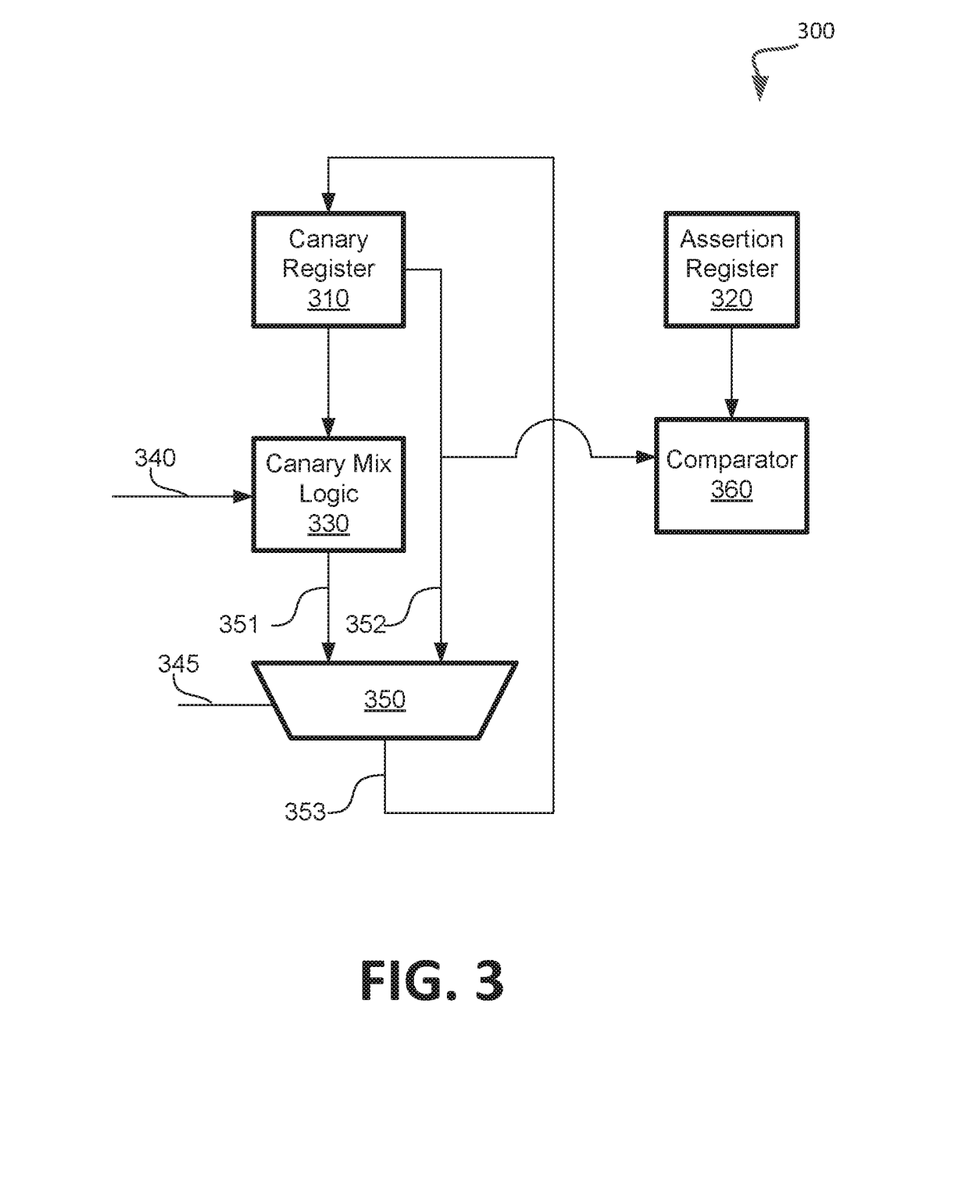
FIG. 3 illustrates a logical representation of a canary component in accordance with some embodiments of the present disclosure.

FIG. 3 illustrates a logical representation of a canary component 300. In general, the canary component 300 may correspond to a portion of the secure computation environment 100 of FIG. 1.

As shown in FIG. 3, the canary component 300 may include a canary register 310 and an assertion register 320. The canary component 300 may further include a canary mix logic 330 that may receive a mix value 340 and an output of the canary register 310 to generate an updated canary value 351. In some embodiments, the canary mix logic 330 may implement a cryptographic operation.

Examples of such a cryptographic operation may include, but are not limited to, a Simon based cipher operation that performs 42 rounds of mixing with the canary mix logic 330 (e.g., 42 iterations of performing the cryptographic operation with the mix value 340 and the updated canary value 351 that is stored in the canary register 310) or a KeccakF100 based cipher with 16 rounds of mixing with the canary mix logic 330. The canary component 300 may further include a selection unit 350 (e.g., a multiplexer) that may receive a selection signal 345 that may be used to identify one of the updated canary value 351 or the current canary value 352 that is currently stored in the canary register 310. The selection signal 345 may indicate to continue performing the cryptographic operation between the value in the canary register 310 and the mix value 340 until a final canary value has been generated. The output 353 of the selection unit 350 may be provided to and stored in the canary register 310 as an updated canary value.

A comparator 360 may receive the current value that is stored in the canary register 310 in response to an indication to compare the current value that is stored in the canary register 310 (e.g., the final canary value) with the assertion value that is stored in the assertion register 320. An output of the comparator 360 may indicate whether the final canary value in the canary register 310 matches the assertion value in the assertion register 320. In some embodiments, the comparator 360 may provide the output in response to receiving an assertion signal corresponding to an indication that a new container has been received by the secure computation environment and its corresponding signature is to be verified.

Figure 4:
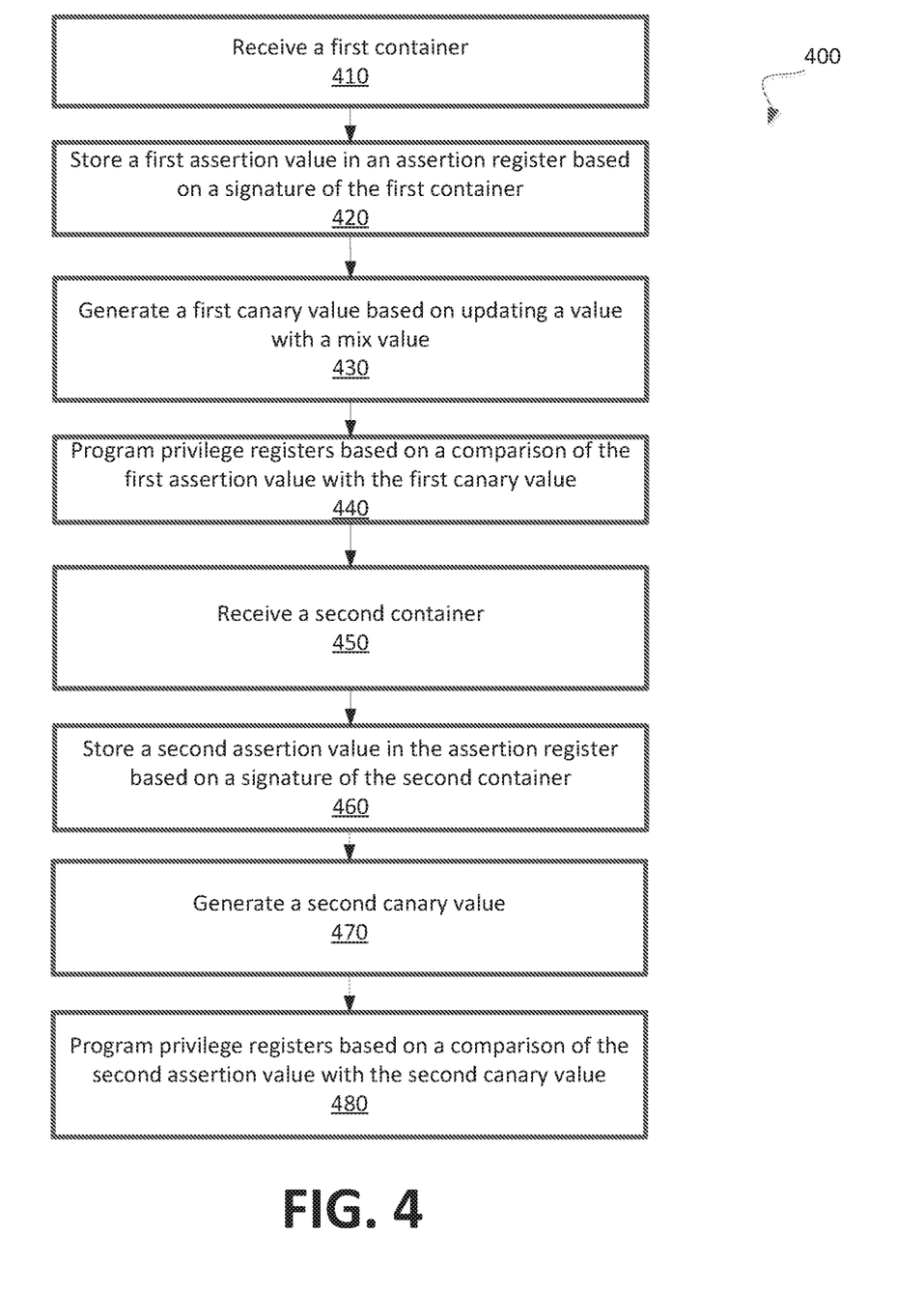
FIG. 4 is a flow diagram of an example method to store a value in an assertion register based on receiving a container in accordance with some embodiments of the present disclosure.

FIG. 4 is a flow diagram of an example method 400 to store a value in an assertion register based on receiving a container. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the secure computation environment 100 of FIG. 1. For example, the canary component 140 may perform the method 400.

As shown in FIG. 4, the method 400 may begin with the processing logic receiving a first container (block 410). The processing logic may further store a first assertion value into an assertion register based on a signature of the first container (block 420). For example, the signature may be based on a type of cryptographic operation that may include, but is not limited to, elliptic curve cryptography (ECC) signatures, RSA signatures, Advanced Encryption Standard (AES) signatures, etc. Thus, different containers may include different types of signatures that may be used to verify privileges (i.e., access permissions to hardware resources) that correspond to the container. Subsequently, the processing logic may generate a first canary value based on updating a value with a mix value (block 430). For example, as previously described, a final canary value may be generated based on one or more cycles of a combination of an intermediate canary value and the mix value until a final canary value (i.e., the first canary value) has been generated. Furthermore, the processing logic may program privilege registers based on a comparison of the first assertion value that is based on a signature of the first container and the first canary value (block 440). For example, values that may be used to allow access to hardware resources may be stored in the privilege registers when the first assertion value that is based on the signature matches with the first canary value. Thus, during the execution of the first container, the hardware resources of a secure computation environment may be accessed when the first assertion value matches with the first canary value.

Referring to FIG. 4, the processing logic may receive a second container (block 450). For example, the second container may be received to be executed by the secure computation environment after the execution of the first container has been completed. The processing logic may further store a second assertion value into the assertion register based on a signature of the second container (block 460). For example, the first assertion value that is stored in the assertion register may be replaced with the second assertion value. In some embodiments, the first assertion value may be replaced or deleted in response to a comparison of the first assertion value with the first canary value. The second assertion value may be different than the first assertion value when the signature of the second container is of a different type than the signature of the first container. The processing logic may subsequently generate a second canary value (block 470) and may program privilege registers based on the comparison of the second assertion value with the second canary value (block 480). For example, the privilege registers may be programmed if the second canary value matches with the second assertion value and may not be programmed if the second canary value does not match with the second assertion value.

As such, different assertion values may be stored in the assertion register based on a characteristic of the container. For example, a different assertion value may be stored in the assertion register for different types of signatures that are associated or included with different containers. Furthermore, different canary values may further be generated based on the different assertion values that are stored in the assertion register.

Figure 5:
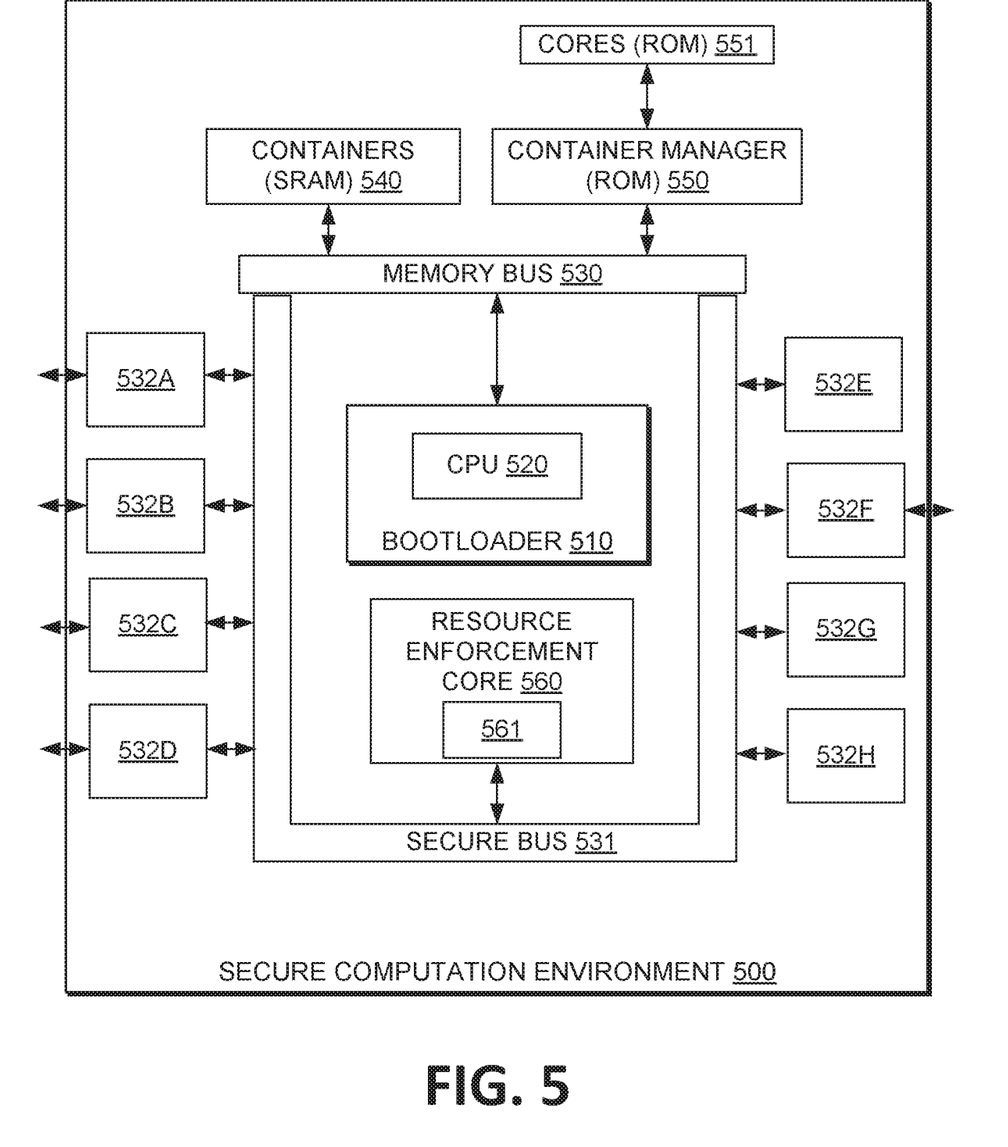
FIG. 5 illustrates an example architecture of a secure computation environment in accordance with some embodiments.

FIG. 5 illustrates an example architecture 500 of a secure computation environment. In general, the architecture 500 may correspond to the secure computation environment 100 of FIG. 1.

As shown in FIG. 5, the architecture 500 may include a bootloader 510 that controls a CPU 520 or other such processing device, a container manager 550 that is stored in ROM or other such memory, and a container 540 that is stored in static random access memory (SRAM) or other such memory. A memory bus 530 may couple the container 540 and the container manager 550 with the bootloader 510 and other hardware resources 532A-H of the architecture 500.

The architecture 500 may include a resource enforcement core 560 that enforces control or access to the hardware resources 532A-H of the architecture 500. For example, the resource enforcement core 560 may include the privilege registers, a canary register (e.g., canary register 120), assertion register (e.g., assertion register 130), and a canary component 561 (e.g., canary component 140). The hardware resources of the architecture 500 may include, but are not limited to, one-time programmable (OTP) memory writes or burns, OTP reads, feature reads, feature writes, reading of cryptographic keys, updating of cryptographic keys, general purpose input/output (GPIO) reads, GPIO writes, an ability to execute code or instructions via or on the CPU 520, access to an executable region of the SRAM, read access to a particular portion of any such memory, write access to a particular portion of such memory, etc. The accesses may be fine grained. For example, the resource enforcement core may allow write access to one byte of the OTP but not to the next byte. Other resources may include access to functionality of cores 551 that are stored in ROM. Such cores 551 may correspond to elliptic curve cryptography (ECC) key generation, ECC signature verification, ECC signature generation, cryptographic key exchange, RSA key generation, RSA encryption or decryption, Advanced Encryption Standard (AES) encryption or decryption, SHA-2 or SHA-3 functionalities etc. In some embodiments, the resource enforcement core 560 may be programmed by the container manager 550 before the execution of each container 540. For example, a container 540 may include an identification of permissions to the features or hardware resources 532A-H and the container manager 550 may program privilege registers or memory of the resource enforcement core 560 based on the permissions of a container 540 that is to be executed. Thus, the resource enforcement core 560 may enforce access to the resources 532A-H via a secure bus 531 for containers 540 that have been verified (e.g., by the signature) by the container manager 250. In some embodiments, one or more of the resources 532A-H may be coupled to external components of a device that includes the architecture 500. For example, a resource 532B may be coupled to another system on a chip (SoC), OTP memory, a random number generator component, or other such components that are external to the secure computation environment.

The bootloader 510 may be a hardware-based state machine that is executed in response to an initialization (i.e., power-up) of the secure computation environment 500 or a device that includes the secure computation environment 500. Furthermore, the bootloader 510 may perform a series of power-on self-tests (e.g., a procedure performed immediately after power-on or start up) of the secure computation environment 500. The self-tests performed by the bootloader 510 may include a verification or performance test of the hardware components of the secure computation environment 500. For example, the self-tests may include a test of the CPU 520 or processing device that is part of the secure computation environment 500. The bootloader 510 may further perform an integrity check of the contents of the ROM of the secure computation environment 500. For example, the bootloader 510 may perform a verification or integrity check of the container manager 550 by retrieving the contents of the container manager 550 and computing an integrity check value of the contents of the container manager 550.

After a successful completion of the self-tests, the bootloader 510 may initiate or execute the container manager 550 that is stored in the ROM. For example, the bootloader 510 may initiate the container manager 550 after verifying the CPU 520 and the ROM or other memory of the secure computation environment 500. The control of the CPU or other hardware resources of the secure computation environment 100 may then be provided from the bootloader 510 to the container manager 550. In some embodiments, the container manager 550 may correspond to a trusted embedded light-weight software that provides functionality to hardware resources 532A-H and software resources of the secure computation environment. The container manager may be software of the device that includes the secure computation environment with higher or highest privileges. The container manager 550 may further receive one or more containers 540 that correspond to untrusted user code that is received from outside of the secure computation environment 500. The container manager 550 may verify permissions (e.g., by using the signature) of a received container 540 to access resources of the secure computation environment 500 and verify the authenticity of the received container 540.

After a verification of a received container, the container manager 550 may provide control of the CPU or processing device of the secure computation environment 500 to the received container. Each of the one or more containers 540 may further correspond to untrusted user code that provides instructions and/or data for accessing resources of the secure computation environment 500. The containers 540 may be received in a series so that the software or hardware resources of the secure computation environment 500 are timeshared between the containers. The container manager may be separately executed each time that one of the containers is received. Thus, if a first container is received and a subsequent container is received, the container manager is executed a first time in response to receiving the first container and the container manager may be again executed a second time in response to receiving the subsequent container. Similarly, the assertion value may be compared with the final canary value for each of the containers in response to each attempt to program the privilege registers of the resource enforcement core 560. As such, the container manager may be executed on-demand based on the receiving of containers. Furthermore, after the container manager 550 has verified a signature of the received containers, the privilege registers of the resource enforcement core 560 may be programmed based on a comparison of a canary value and an assertion value as previously described.

Figure 6:
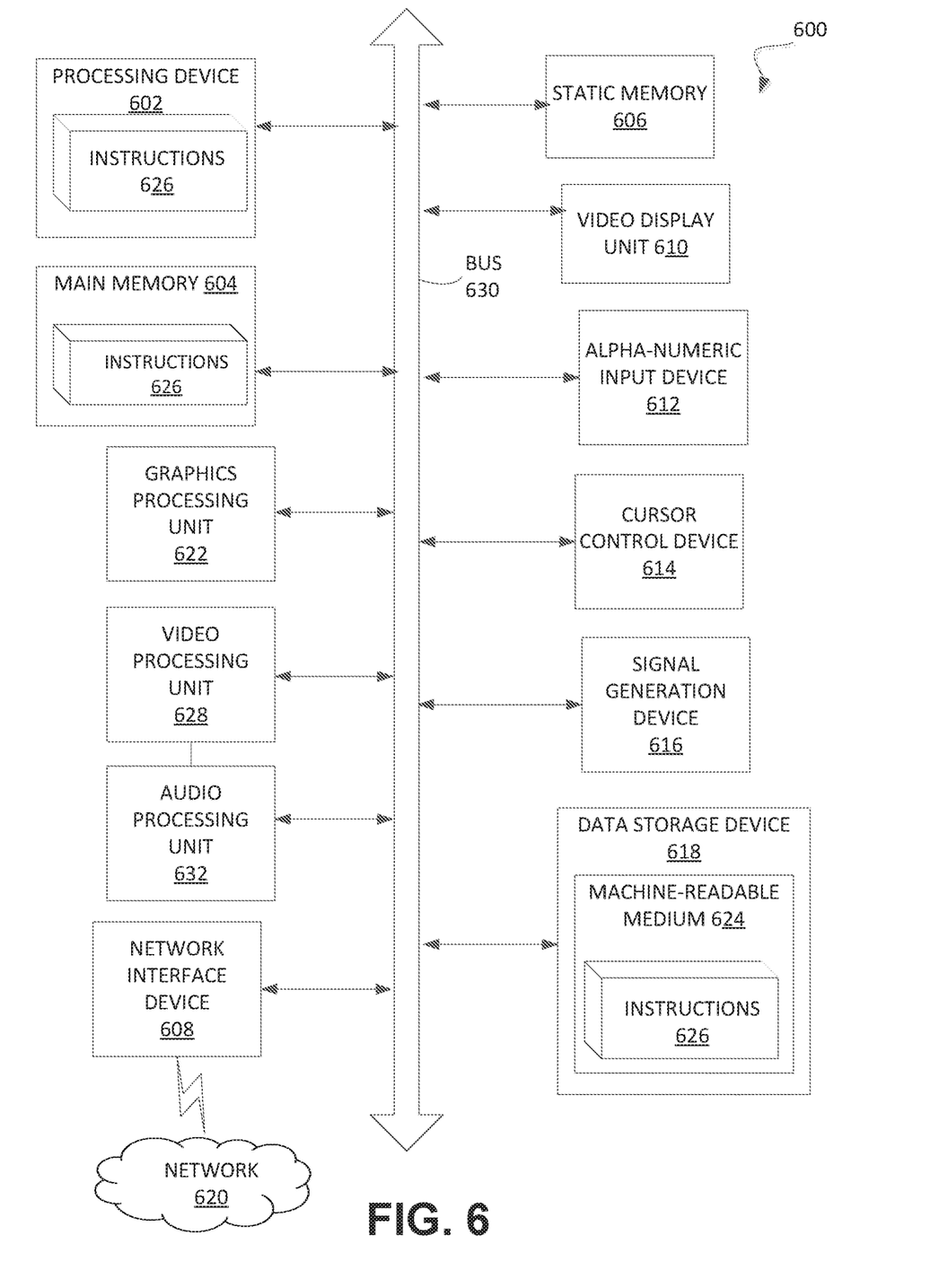
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 6128, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a container manager or a canary component. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising:
   a memory; and
   a processing device, operatively coupled with the memory, to:
   execute an operating system;
   verify, by the operating system, a software executable prior to loading the software executable;
   load, by the software executable prior to a computation, an expected value in a first register;
   periodically compute, using a cryptographic algorithm, an output value based on a state value stored in a second register and a deterministic value stored in a third register, the deterministic value being associated with a characteristic of the computation;
   compare the output value with the expected value; and generate a flag that indicates an attack responsive to the output value not matching the expected value.

2. The system of claim 1, wherein the cryptographic algorithm is non-reversible.

3. The system of claim 2, wherein the cryptographic algorithm is a Simon-based cipher or a Keccak-based cipher.

4. The system of claim 1, wherein, to verify the software executable, the processing device is to verify a digital signature.

5. The system of claim 1, wherein, to verify the software executable, the processing device is to perform an integrity check of the contents of the software executable.

6. The system of claim 1, wherein the operating system is a secure operating system or the processing device is a secure central processing unit (CPU).

7. The system of claim 1, wherein the software executable is a container.

8. The system of claim 1, wherein the state value is stored in the second register by at least one of the software executable, the operating system, or a secure central processing unit (CPU) of the processing device.

9. A method comprising:
executing, by a processing device, an operating system;
verifying, by the operating system, a software executable prior to loading the software executable;
loading, by the software executable prior to a computation, an expected value in a first register;
periodically computing, using a cryptographic algorithm, an output value based on a state value stored in a second register and a deterministic value stored in a third register, the deterministic value being associated with a characteristic of the computation;
comparing the output value with the expected value; and
generating a flag that indicates an attack responsive to the output value not matching the expected value.

10. The method of claim 9, wherein the cryptographic algorithm is non-reversible.

11. The method of claim 10, wherein the cryptographic algorithm is a Simon-based cipher or a Keccak-based cipher.

12. The method of claim 9, wherein verifying the software executable comprises verifying a digital signature.

13. The method of claim 9, wherein verifying the software executable comprises performing an integrity check of the contents of the software executable.

14. The method of claim 9, wherein the operating system is a secure operating system or the processing device is a secure central processing unit (CPU).

15. The method of claim 9, wherein the software executable is a container.

16. The method of claim 9, further comprising storing the state value in the second register by at least one of the software executable, the operating system, or a secure central processing unit (CPU) of the processing device.

17. A non-transitory computer readable medium comprising instructions that, when executed by a processing device, cause the processing device to perform operations comprising:
executing an operating system;
verifying, by the operating system, a software executable prior to loading the software executable;
loading, by the software executable prior to a computation, an expected value in a first register;
periodically computing, using a cryptographic algorithm, an output value based on a state value stored in a second register and a deterministic value stored in a third register, the deterministic value being associated with a characteristic of the computation;
comparing the output value with the expected value; and
generating a flag that indicates an attack responsive to the output value not matching the expected value.

18. The non-transitory computer readable medium of claim 17, the operations further comprising storing the state value in the second register by at least one of the software executable, the operating system, or a secure central processing unit (CPU) of the processing device.

19. The non-transitory computer readable medium of claim 17, wherein verifying the software executable comprises verifying a digital signature.

20. The non-transitory computer readable medium of claim 17, verifying the software executable comprises performing an integrity check of the contents of the software executable.

* * * * *